United States Patent
Onozuka et al.

(10) Patent No.: US 11,479,698 B2
(45) Date of Patent: Oct. 25, 2022

(54) CHLOROPRENE RUBBER LATEX ADHESIVE COMPOSITION

(71) Applicant: DENKA COMPANY LIMITED, Tokyo (JP)

(72) Inventors: Masao Onozuka, Itoigawa (JP); Gaito Kiyofuji, Itoigawa (JP); Shogo Hagiwara, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 886 days.

(21) Appl. No.: 16/323,975

(22) PCT Filed: Aug. 30, 2017

(86) PCT No.: PCT/JP2017/031221
§ 371 (c)(1),
(2) Date: Feb. 7, 2019

(87) PCT Pub. No.: WO2018/043586
PCT Pub. Date: Mar. 8, 2018

(65) Prior Publication Data
US 2020/0190374 A1 Jun. 18, 2020

(30) Foreign Application Priority Data
Sep. 2, 2016 (JP) .............................. JP2016-172095

(51) Int. Cl.
| | |
|---|---|
| *C09J 111/02* | (2006.01) |
| *C08K 3/22* | (2006.01) |
| *C08L 27/04* | (2006.01) |
| *C09J 129/04* | (2006.01) |
| *C09J 133/06* | (2006.01) |
| *C09J 147/00* | (2006.01) |
| *C09J 193/04* | (2006.01) |
| *C08L 27/22* | (2006.01) |

(52) U.S. Cl.
CPC .............. *C09J 111/02* (2013.01); *C08K 3/22* (2013.01); *C08L 27/04* (2013.01); *C08L 27/22* (2013.01); *C09J 129/04* (2013.01); *C09J 133/064* (2013.01); *C09J 147/00* (2013.01); *C09J 193/04* (2013.01); *C08K 2003/2296* (2013.01); *C08L 2205/035* (2013.01)

(58) Field of Classification Search
CPC .... C09J 111/02; C09J 129/04; C09J 133/064; C09J 147/00; C09J 193/04; C09J 11/04; C09J 11/06; C09J 113/02; C09J 123/28; C09J 11/08; C08K 3/22; C08K 2003/2296; C08L 27/04; C08L 27/22; C08L 2205/035; C08L 11/00; C08L 29/04; C08L 11/02; C08L 13/02; C08L 93/04; C08F 236/18
See application file for complete search history.

(56) References Cited

U.S. PATENT DOCUMENTS

| | | | |
|---|---|---|---|
| 5,753,727 A | 5/1998 | Sato et al. | |
| 7,214,634 B2 | 5/2007 | Yashima et al. | |
| 7,589,146 B2 | 9/2009 | Yashima et al. | |
| 2007/0251640 A1 | 11/2007 | Freund et al. | |
| 2014/0087110 A1* | 3/2014 | Ogasawara ............ | C09J 115/00 428/492 |
| 2018/0111352 A1* | 4/2018 | Wakamatsu ............ | B32B 5/024 |

FOREIGN PATENT DOCUMENTS

| | | |
|---|---|---|
| CN | 1685207 A | 10/2005 |
| CN | 101454417 A | 6/2009 |
| EP | 0733689 A1 | 9/1996 |
| EP | 1384767 A1 | 1/2004 |
| EP | 1498452 A1 | 1/2005 |
| JP | S62-096576 A | 5/1987 |
| JP | 2001-303002 A | 10/2001 |
| JP | 2002-275442 A | 9/2002 |
| JP | 2004-352876 A | 12/2004 |
| JP | 2007-332206 A | 12/2007 |
| JP | 2009-535463 A | 10/2009 |
| JP | 2010-084023 A | 4/2010 |
| JP | 2011-063672 A | 3/2011 |
| JP | 2013-159741 A | 2/2012 |
| JP | 2012-158694 A | 8/2012 |
| WO | 2004/031717 A1 | 4/2004 |

OTHER PUBLICATIONS

Europe Patent Office, "Search Report for European Patent Application No. 17846590.2," dated May 8, 2019.
PCT/ISA/210, "International Search Report for International Application No. PCT/JP2017/031221," dated Nov. 14, 2017.
Taiwan Intellectual Property Office, "Office Action for Taiwanese Patent Application 106129929," dated Aug. 12, 2022.

* cited by examiner

Primary Examiner — Cynthia L Schaller
(74) Attorney, Agent, or Firm — Manabu Kanesaka

(57) ABSTRACT

Provided is a chloroprene rubber latex adhesive composition superior in initial adhesive strength and normal adhesive strength and also in thermal creep resistance with adherend. A chloroprene rubber latex adhesive composition includes a carboxy-modified chloroprene-based copolymer latex (A) containing a copolymer of chloroprene monomer and an ethylenic unsaturated carboxylic acid and a polyvinylalcohol, a chloroprene-based polymer latex (B) containing a chloroprene homopolymer or a copolymer of chloroprene monomer and other monomer and a rosin acid metal salt and a chlorinated polyolefin resin emulsion (C), wherein the content ratio of the carboxy-modified chloroprene-based copolymer latex (A) to the chloroprene-based polymer latex (B) is 80:20 to 20:80 as solid matter.

7 Claims, No Drawings

CHLOROPRENE RUBBER LATEX ADHESIVE COMPOSITION

RELATED APPLICATIONS

The present application is National Phase of International Application No. PCT/JP2017/031221 filed Aug. 30, 2017, and claims priority from Japanese Application No. 2016-172095, filed Sep. 2, 2016, the disclosure of which is hereby incorporated by reference herein in its entirety.

TECHNICAL FIELD

The present invention relates to a chloroprene rubber latex adhesive composition.

BACKGROUND ART

Chloroprene rubber latexes have been used in various fields including aqueous adhesives for civil engineering and construction, plywoods, furnitures, shoes, wet suits, and others, immersion-molded articles such as labor work gloves, laboratory gloves, medical gloves, rubber threads, and balloons, waterproof coating films for civil engineering and construction. Aqueous adhesives are characterized in that they, which are aqueous compositions, are higher in safety, have favorable contact efficiency and are superior in initial adhesive strength. In particular, chloroprene rubber latexes that are produced by using polyvinylalcohol (PVA) as emulsifier are often used as aqueous adhesives, as they are superior in compositional stability and tackiness.

Although the chloroprene rubber latex adhesives have a wide range of application, they are extremely less adhesive to low polarizing substances such as polyolefins that do not have polar groups on the surface. Polyolefin resins, which are superior in water and chemical resistance and toughness, have been used widely as materials for various molded articles such as electrical insulating materials and daily miscellaneous goods and lack of adhesiveness to polyolefin resins gives severe restriction on the process for manufacturing these products. In particular, it is highly difficult to use chloroprene rubber latex adhesives in applications demanding high thermal creep resistance and there are many studies for further improvement in heat resistance of chloroprene rubber latex adhesives that are demanded recently.

For example, Patent Document 1 discloses an adhesive composition improved in thermal creep resistance that is prepared by using a chloroprene rubber latex having a particular gel content.

Alternatively, Patent Document 2 discloses a blended adhesive composition further improved in adhesive physical properties that is prepared by blending chloroprene rubber latexes different in gel content and adding a carbodiimide crosslinking agent to the blend.

CITATION LIST

Patent Documents

Patent Document 1: JP-A No. 2002-275442
Patent Document 2: JP-A No. 2011-063672

SUMMARY OF THE INVENTION

Technical Problem

The present invention provides a chloroprene rubber latex adhesive composition superior in initial adhesive strength and normal adhesive strength and also in thermal creep resistance with adherend.

Solution to Problem

Specifically, the present invention provides a chloroprene rubber latex adhesive composition comprising a carboxy-modified chloroprene-based copolymer latex (A) containing a copolymer of chloroprene monomer and an ethylenic unsaturated carboxylic acid and a non-ionic surfactant polyvinylalcohol; a chloroprene-based polymer latex (B) containing a chloroprene homopolymer or a copolymer of chloroprene monomer and other monomers and a rosin acid metal salt; and a chlorinated polyolefin resin emulsion (C), wherein the content ratio of the carboxy-modified chloroprene-based copolymer latex (A) to the chloroprene-based polymer latex (B) is 80:20 to 20:80 as solid matter.

The chloroprene rubber latex adhesive composition according to the present technology can contain the chlorinated polyolefin resin emulsion (C) in an amount of 1 to 50 parts by mass as solid matter with respect to 100 parts by mass as solid matter of the total content of the carboxy-modified chloroprene-based copolymer latex (A) and the chloroprene-based polymer latex (B).

The chloroprene rubber latex adhesive composition according to the present technology can contain a tackifying resin in an amount of 1 to 100 parts by mass as solid matter and zinc oxide in an amount of 0.5 to 10 parts by mass as solid matter with respect to 100 parts by mass as solid matter of the total content of the carboxy-modified chloroprene-based copolymer latex (A) and the chloroprene-based polymer latex (B).

The adherends to which the chloroprene rubber latex adhesive composition according to the present technology can be used is, for example, polyolefins.

Advantageous Effects of Invention

The present invention provides a chloroprene rubber latex adhesive composition superior in initial adhesive strength and normal adhesive strength and also in thermal creep resistance with adherend.

DESCRIPTION OF EMBODIMENTS

Hereinafter, favorable embodiments of the present invention will be described. The embodiments described below are only typical examples of the embodiments of the present invention and it should be understood that the scope of the present invention shall not be restricted thereby.

The chloroprene rubber latex adhesive composition of the present embodiment comprises at least a carboxy-modified chloroprene-based copolymer latex (A), a chloroprene-based polymer latex (B), and a chlorinated polyolefin resin emulsion (C). It may contain, as needed, a tackifying resin, zinc oxide, and the like. Hereinafter, each component will be described in detail.

Chloroprene rubber latex (also referred to as "chloroprene-based polymer latex") is a latex (emulsion) obtained by dispersing polychloroprene in water. The chloroprene rubber is a homopolymer of 2-chloro-1,3-butadiene (hereinafter, referred to as chloroprene) or a copolymer of chloroprene and monomers copolymerizable with chloroprene.

Examples of the monomers copolymerizable with chloroprene include 2,3-dichloro-1,3-butadiene, 1-chloro-1,3-butadiene, sulfur, butadiene, isoprene, styrene, methacrylic acid and the esters thereof, and acrylic acid and the esters thereof, and these monomers may be used in combination of two or more, as needed.

<Carboxy-Modified Chloroprene-Based Copolymer Latex (A)>

In the carboxy-modified chloroprene-based copolymer latex (A) used in the chloroprene rubber latex adhesive composition of the present embodiment, the chloroprene-based polymer is a copolymer of chloroprene monomer and an ethylenic unsaturated carboxylic acid. If a carboxy group-containing vinyl monomer is copolymerized, when a metal oxide such as zinc oxide or magnesium oxide is blended to the adhesive, the bivalent metal ion and carboxy groups in the resulting adhesive composition crosslink with each other, thus improving adhesive properties such as thermal creep resistance and solvent resistance.

Any known ethylenic unsaturated carboxylic acids may be used alone or in combination of two or more, as arbitrarily determined, as the ethylenic unsaturated carboxylic acid, if it does not impair the advantageous effects of the present invention. In the present embodiment, it is preferably methacrylic acid and/or acrylic acid.

The amount of the ethylenic unsaturated carboxylic acids used is not particularly limited and may be determined arbitrarily, if it does not impair the advantageous effects of the present invention. In the present embodiment, the amount of the ethylenic unsaturated carboxylic acids used is preferably 0.5 to 10 mass %, more preferably 1 to 4 mass %, with respect to a total amount of chloroprene monomer of 100 mass %. When the amount of the ethylenic unsaturated carboxylic acids used is 0.5 mass % or more, it is possible to improve the thermal creep resistance of the aqueous adhesive when prepared. When the amount of the ethylenic unsaturated carboxylic acid used is 10 mass % or less, it is possible to prevent deterioration in storage stability of the latex composition.

The amount of the ethylenic unsaturated carboxylic acids in the carboxy-modified chloroprene-based copolymer latex (A) can be determined by gas chromatographic measurement with a calibration curve obtained with samples having known bonding amounts of the ethylenic unsaturated carboxylic acids.

For preparation of the carboxy-modified chloroprene-based copolymer latex (A), chloroprene alone or chloroprene and a monomer copolymerizable with chloroprene are emulsion-polymerized using a polymerization initiator and a chain-transfer agent in the presence of polyvinylalcohol (hereinafter, referred to also as "PVA") and a terminator is added to terminate polymerization when the polymerization reaches a particular polymerization rate.

In preparation of the carboxy-modified chloroprene-based copolymer latex (A) for use in the chloroprene rubber latex adhesive composition of the present embodiment, it is essential to use polyvinylalcohol (PVA) as the emulsifier used in emulsion polymerization of chloroprene. The PVA, which is a nonionic surfactant, is a polymer obtained by saponification of a homopolymer of a vinyl ester monomer or a copolymer of a vinyl ester monomer and a monomer copolymerizable therewith.

The polymerization degree of the polyvinylalcohol is not particularly limited, but the polymerization rate is preferably 150 to 3000, more preferably 200 to 700, from the viewpoint of the stability of the chloroprene rubber latex.

The content of the polyvinylalcohol can be determined, as a freeze-dried chloroprene rubber latex is cut into pieces; the sample is extracted with hot water, as it is placed in a round-bottomed flask with a condenser; and the extract is analyzed by NMR.

The preparative method for the carboxy-modified chloroprene-based copolymer latex (A) described above is not particularly limited and may be any known method, if it does not impair the advantageous effects of the present invention. For example, it can be prepared similarly to the method described in JP-A No. 2013-159741.

<Chloroprene-Based Polymer Latex (B)>

The chloroprene-based polymer latex (B) used in the chloroprene rubber latex adhesive composition of the present embodiment contains a chloroprene homopolymer or a copolymer of chloroprene monomer and other monomers as well as a rosin acid metal salt.

In preparation of the chloroprene-based polymer latex (B), chloroprene alone or chloroprene and a monomer copolymerizable with chloroprene is emulsion-polymerized using a polymerization initiator and a chain-transfer agent in the presence of a rosin acid metal salt and a terminator is added for termination of polymerization when polymerization reaches a particular polymerization rate.

The chloroprene-based polymer latex (B) used in the chloroprene rubber latex adhesive composition of the present embodiment preferably has a rosin acid metal salt content of 0.5 to 8 mass %, more preferably 1.5 to 5 mass %, as determined by gas chromatographic measurement. When the content of the rosin acid metal salt is 0.5 mass % or more, it is possible to prevent shortage of protective colloid during emulsion polymerization and thus to improve polymerization stability. When the rosin acid metal salt content is 8 mass % or less, it is possible to prevent excessive increase in viscosity of the polymerization reaction system, thus permitting uniform agitation.

The content of the rosin acid metal salt can be determined, as a freeze-dried chloroprene rubber latex is cut into pieces; the sample is extracted with ETA, as it is placed in a round-bottomed flask with a condenser; and the extract is analyzed by gas chromatography on the basis of the peak areas of the rosin components.

The preparative method for the chloroprene-based polymer latex (B) is not particularly limited and any known method may be used, if it does not impair the advantageous effects of the present invention. It can be prepared similarly to the methods described, for example, in JP-A Nos. S48-84891, H11-158327, and 2013-159741.

The gel content of the chloroprene-based polymer latex (B) is also not particularly limited, if it does not impair the advantageous effects of the present invention. The gel content of the chloroprene-based polymer latex is determined by the following method: A chloroprene-based polymer latex is freeze-dried, to give agglomerates; the agglomerates are immersed in toluene for 2 days; the mixture is filtered with a 200 mesh screen (opening: 0.075 mm) and the resin remaining on the screen is vacuum-dried for removal of toluene, to give a gel. The gel content can be determined from the ratio of the weight of the gel to the weight of the agglomerates.

The chloroprene rubber latex adhesive composition of the present embodiment is characterized by containing two kinds of chloroprene rubber latexes having different characteristics, as described above. For favorable balance of the properties of initial adhesive strength, normal adhesive strength, and thermal creep resistance with adherend, the content ratio of the carboxy-modified chloroprene-based copolymer latex (A) to the chloroprene-based polymer latex (B) is 80:20 to 20:80 as solid matter. A content of the carboxy-modified chloroprene-based copolymer latex (A) of more than 80 mass % leads to deterioration in thermal creep resistance, while a content of less than 20 mass % leads to deterioration in initial adhesive strength and normal adhesive strength.

<Chlorinated Polyolefin Resin Emulsion (C)>

The chlorinated polyolefin resin emulsion (C) is a resin emulsion prepared by chlorination or acid modification of a polyolefin. The chlorinated polyolefin resin emulsion (C) is a component for providing the chloroprene rubber latex adhesive composition with adhesiveness to polyolefin resins.

The content of the chlorinated polyolefin resin emulsion (C) is not particularly limited and may be determined arbitrarily, if it does not impair the advantageous effects of the present invention. In the present embodiment, it is preferable to use the chlorinated polyolefin resin emulsion (C) in an amount of 1 to 50 parts by mass as solid matter, more preferably 5 to 40 parts by mass as solid matter, with respect to 100 parts by mass of the chloroprene rubber latex as solid matter. It is not possible to obtain favorable adhesiveness to polyolefin resins without addition of the chlorinated polyolefin resin emulsion and an excessively large addition amount thereof may result in deterioration in thermal creep resistance and thus inevitably leads to cost increase.

The raw material for the chlorinated polyolefin resin emulsion (C) may be determined arbitrarily from known raw materials for chlorinated polyolefin resin emulsions, if it does not impair the advantageous effects of the present invention. Examples thereof include crystalline polypropylenes, non-crystalline polypropylenes, polybutene-1, low-density or high-density polyethylenes, ethylene-propylene copolymers, and ethylene-propylene-diene copolymers.

The chlorinated polyolefin resin emulsion (C) is preferably an acid-modified chlorinated polyolefin resin emulsion prepared by graft polymerization with at least one monomer selected from α,β-unsaturated carboxylic acids and the anhydrides thereof. Examples of the α,β-unsaturated carboxylic acids and the anhydrides thereof that are used therein include maleic acid, itaconic acid, citraconic acid, fumaric acid, mesaconic acid, aconitic acid, maleic anhydride, itaconic acid anhydride, citraconic anhydride, and aconitic anhydride. If the chlorinated polyolefin resin emulsion (C) is modified with an acid, when a metal oxide such as zinc oxide or magnesium oxide is blended to the adhesive, the bivalent metal ion and carboxy groups in the resulting adhesive crosslink with each other, thus improving adhesive properties such as thermal creep resistance and solvent resistance.

The chlorine content of the chlorinated polyolefin resin emulsion is not particularly limited, but preferably 10 to 40%. It is possible when the chlorine content is 10% or more to improve compatibility with the polychloroprene latex. It is also possible when the chlorine content is less than 40% to prevent deterioration in adhesiveness to adherend, for example to a polyolefin base material.

The surfactant used in the chlorinated polyolefin resin emulsion (C) is not particularly limited, if it does not impair the advantageous effects of the present invention, and examples thereof include nonionic surfactants, anionic surfactants, cationic surfactants, and amphoteric surfactants. In the present technology, a nonionic surfactant is preferably used from the viewpoint of storage stability of the adhesive composition.

Examples of commercial products that can be used as the chlorinated polyolefin resin emulsion (C) include EW-5303 and EH-801 produced by Toyobo Co., Ltd.

<Tackifying Resin>

The chloroprene rubber latex adhesive composition of the present embodiment may contain a tackifying resin in addition to the carboxy-modified chloroprene-based copolymer latex (A), the chloroprene-based polymer latex (B), and the chlorinated polyolefin resin emulsion (C).

The tackifying resin is added for improvement in the initial adhesive strength of the chloroprene rubber latex adhesive composition. In particular, it can improve the adhesiveness when a polyolefin is used as the adherend.

The tackifying resin is preferably used in an amount of 1 to 100 parts by mass as solid matter, more preferably 20 to 70 parts by mass as solid matter, with respect to 100 parts by mass of the chloroprene rubber latex as solid matter. When the addition amount of the tackifying resin is 1 part or more by mass, it is possible to improve initial adhesive strength. When the addition amount of the tackifying resin is 100 parts or less by mass, it is possible to prevent deterioration in thermal creep resistance with adherend.

The kind of the tackifying resins is not particularly limited, and examples thereof include rosin-base resins such as gum rosins, tall rosins, wood rosins, disproportionated rosins, polymerized rosins, glycerol esters and pentaerythritol esters of these rosins and hydrogenated derivatives thereof terpene phenol-based resins such as hydrogenated derivatives of terpene phenol resins, petroleum resins such as aliphatic petroleum resins, alicyclic petroleum resins, aromatic petroleum resins, copolymeric petroleum resins, dicyclopentadiene-based petroleum resins, pure monomer-based petroleum resins, and hydrogenated derivatives thereof styrenic resins, coumarone-indene-based resins, alkylphenol-based resins, xylene resins, dammer, copal, and shellac.

Commercial products of the tackifying resins that can be used in the present embodiment include terpene phenol resin emulsions, TAMANOL E-100 and TAMANOL E-200NT, produced by Arakawa Chemical Industries, Ltd. and the like.

<Zinc Oxide>

The chloroprene rubber latex adhesive composition of the present embodiment may contain zinc oxide in addition to the carboxy-modified chloroprene-based copolymer latex (A), the chloroprene-based polymer latex (B), and the chlorinated polyolefin resin emulsion (C).

Zinc oxide is added for improvement in adhesive strength and thermal creep resistance of the adhesive composition. Particularly when carboxy groups are present in the adhesive composition, as bivalent metal ions and carboxy groups crosslink with each other, it is possible to improve the thermal creep resistance further. It is also possible to improve adhesiveness when a polyolefin is used as the adherend.

Zinc oxide is preferably used in an amount of 0.5 to 10 parts by mass as solid matter, more preferably 1 to 5 parts by mass as solid matter, with respect to as 100 parts by mass of the chloroprene rubber latex as solid matter. When the addition amount of zinc oxide is 0.5 part or more by mass, it is possible to improve thermal creep resistance. When the addition amount of zinc oxide is 10 parts or less by mass, it is possible to prevent reduction in initial adhesive strength and thus to reduce production cost.

The zinc oxide used in the present embodiment is not particularly limited, and any known zinc oxide may be used. The number-average particle diameter of the zinc oxide is particularly preferably 0.1 to 0.3 μm. The number-average particle diameter of zinc oxide is the number average of the tangential diameters along a specified direction (Feret diameters) of the images of 200 zinc oxide particles, which are obtained by dispersing zinc oxide in water under ultrasonic irradiation and air drying the mixture, as determined under a SEM apparatus (FE-SEM SU6600 manufactured by Hitachi High-Technologies Corporation) It is possible by using zinc oxide having a number-average particle diameter of 0.1 μm or more to prevent aggregation of zinc oxide particles and thus disperse the particles uniformly in the chloroprene rubber latex adhesive composition and it is also possible to improve handling efficiency by preventing scattering of the zinc oxide itself. It is possible by using zinc oxide having a number-average particle diameter of 0.3 μm or less to improve adhesive strength reliably.

The specific surface area of the zinc oxide used in the present embodiment is also not particularly limited, but preferably 15 to 25 $m^2/g$. The specific surface area of zinc oxide is a value determined on a specific surface area analyzer (MONOSORB manufactured by QUANTACHROME INSTRUMENTS) according to JIS-Z8830, by the BET method employing nitrogen as the adsorbate, which uses as the sample, a powder obtained by dispersing zinc oxide in water under ultrasonic irradiation and air-drying the dispersion. It is possible, by using zinc oxide having a specific surface area of 15 $m^2/g$ or more, to accelerate crosslinking of the chloroprene rubber latex and the chlorinated polyolefin resin emulsion and to improve adhesive strength of the chloroprene rubber latex adhesive composition obtained. Meanwhile, if zinc oxide having a specific surface area of 25 $m^2/g$ or less, which is less hygroscopic, is used, it is possible to prevent deterioration in quality of the zinc oxide itself and thus, such a zinc oxide can be used favorably in industrial production.

An example of the zinc oxide satisfying the conditions above in number-average particle diameter and specific surface area is a zinc oxide dispersion by wet production method, which is prepared by allowing reaction of a reaction solution consisting of an aqueous inorganic zinc salt solution and an aqueous alkaline solution in a stirred reaction tank. For easier uniform mixing, zinc oxide may be dispersed in water before addition to the chloroprene rubber latex. Any common anionic emulsifier may be used as the emulsifier for dispersion of zinc oxide in water and examples thereof include commercial products such as Darvan No. 1 (trade name, produced by R. T. Verderbilt Company).

Examples of commercial products of zinc oxide that may be used in the present embodiment include AZ-SW produced by Osaki Industry Co., Ltd. and META-Z produced by Inoue Calcium Corporation.

<Miscellaneous>

The chloroprene rubber latex adhesive composition of the present embodiment may contain additionally inorganic fillers such as calcium carbonate and silica, aging inhibitors, vulcanization accelerators, surfactants, antiseptics, antifoams, dispersants, levelling agents, anti-freezing agents and the like, as needed.

The chloroprene rubber latex of the present embodiment described above can be used to various kinds of adherends and can be used particularly favorably when polyolefin is the adherend. Thus, it is useful in adhesive applications in which at least one adherend is polyolefin and high thermal creep resistance is required, for example, for adhesion of a polyolefin base material used as car interior material with a polyurethane foam and also for adhesion of a polyolefin base material with a fabric.

EXAMPLES

Hereinafter, the present invention will be described more in detail with reference to Examples. The Examples described below are only examples of typical Examples of the present invention and it should be understood that the scope of the present invention shall not be restricted thereby.

Preparative Example 1

[Preparation of Carboxy-Modified Chloroprene-Based Copolymer Latex (A)-1]

100 parts by mass of pure water and 4.0 parts by mass of polyvinylalcohol (trade name "UHR-20H" produced by Unitika Ltd., saponification value: 79 mol %, polymerization degree: 380) were placed in a reactor having an internal capacity of 3 liters under nitrogen stream and, after solubilization, 98 parts by mass of a chloroprene-based monomer, 2 parts by mass of methacrylic acid, and 0.3 part by mass of octyl mercaptan were added thereto, as the mixture was agitated. The mixture was allowed to polymerize, as it was kept at 45° C., using potassium persulfate and sodium sulfite as initiators, to give a carboxy-modified chloroprene-based copolymer latex (A)-1.

Preparative Example 2

[Preparation of Chloroprene-Based Polymer Latex 001]

100 parts by mass of pure water, 4.0 parts by mass of rosin acid potassium salt (trade name: "RONDIS" (registered trademark), produced by Arakawa Chemical Industries, Ltd.), 1.0 part by mass of potassium hydroxide, and 0.8 part by mass of sodium ß-naphthalenesulfonate (trade name: "DEMOL NL" (registered trademark) produced by Kao Corporation) were placed in a reactor having an internal capacity of 3 liters under nitrogen stream and, after solubilization, 90 parts by mass of a chloroprene-based monomer, 10 parts by mass of 2,3-dichloro-1,3-butadiene, and 0.03 part by mass of dodecylmercaptan were added thereto, as the mixture was agitated. The mixture was allowed to polymerize, as it was kept at 40° C., using potassium persulfate and sodium sulfite as initiators, and a phenothiazine emulsion was added thereto to terminate polymerization, when the polymerization rate reached 90%. Unreacted monomers were removed under reduced pressure, to give a chloroprene-based polymer latex (B)-1. The chloroprene-based polymer latex (B)-1 had a gel content of 90%.

Preparative Example 3

[Preparation of Chloroprene-Based Polymer Latex (B)-2]

100 parts by mass of pure water, 4.0 parts by mass of rosin acid potassium salt (trade name: "RONDIS" (registered trademark) produced by Arakawa Chemical Industries, Ltd.), 1.0 part by mass of potassium hydroxide, 0.8 part by mass of sodium ß-naphthalenesulfonate (trade name: "DEMOL NL" (registered trademark) produced by Kao Corporation) were placed in a reactor having an internal capacity of 3 liters under nitrogen stream and, after solubilization, 100 parts by mass of a chloroprene-based monomer and 0.1 part by mass of dodecylmercaptan were added thereto, as the mixture was agitated. The mixture was allowed to polymerize, as it was kept at 10° C., using potassium persulfate and sodium sulfite as initiators, and a phenothiazine emulsion was added thereto to terminate polymerization when the polymerization rate reached 90%.

Unreacted monomers were removed under reduced pressure, to give a chloroprene-based polymer latex (B)-2. The chloroprene-based polymer latex (B)-2 had a gel content of 8%.

Example 1

50 parts by mass as solid matter of the carboxy-modified chloroprene-based copolymer latex (A)-1 as the carboxy-modified chloroprene-based copolymer latex (A), 50 parts by mass as solid matter of the chloroprene-based polymer latex (B)-1 as the chloroprene-based polymer latex (B), 15 parts by mass as solid matter of EW-5303 (produced by Toyobo) as the chlorinated polyolefin resin emulsion (C), 50 parts by mass as solid matter of TAMANOL E-100 (produced by Arakawa Chemical Industries, Ltd.) as the tackifying resin, and 1 part by mass as solid matter of AZ-SW (produced by Osaki Industry Co., Ltd.) as zinc oxide were mixed, to give a chloroprene rubber latex adhesive composition of Example 1.

Example 2

A chloroprene rubber latex adhesive composition of Example 2 was prepared under a condition similar to that in Example 1, except that the chloroprene-based polymer latex (B)-2 was added, replacing the chloroprene-based polymer latex (B)-1, as the chloroprene-based polymer latex (B) under the condition shown in Table 1.

Example 3

A chloroprene rubber latex adhesive composition of Example 3 was prepared under a condition similar to that in Example 1, except that EH-801 (produced by Toyobo) was added, replacing EW-5303, as the chlorinated polyolefin resin emulsion (C) under the condition shown in Table 1.

Examples 4 and 5

Chloroprene rubber latex adhesive compositions of Examples 4 and 5 were prepared under a condition similar to that in Example 1, except that the addition amounts of the carboxy-modified chloroprene-based copolymer latex (A)-1 and the chloroprene-based polymer latex (B)-1 were modified under the condition shown in Table 1.

Examples 6 and 7

Chloroprene rubber latex adhesive compositions of Examples 6 and 7 were prepared under a condition similar to that in Example 1, except that the addition amount of the chlorinated polyolefin resin emulsion (C) was modified under the condition shown in Table 1.

Examples 8 and 9

Chloroprene rubber latex adhesive compositions of Examples 8 and 9 were prepared under a condition similar to that in Example 1, except that the addition amount of the tackifying resin was modified under the condition shown in Table 1.

Example 10

A chloroprene rubber latex adhesive composition of Example 10 was prepared under a condition similar to that in Example 1, except that the addition amount of zinc oxide was modified under the condition shown in Table 1.

Comparative Examples 1 to 12

Chloroprene rubber latex adhesive compositions of Comparative Examples were prepared under a condition similar to that in Example 1, except that the adhesive compositions were adjusted under the conditions shown in Table 2.

A sample was prepared from each of the chloroprene rubber latex adhesive compositions thus obtained and the adhesive strength of the sample was determined, as described below. The blending composition shown in Tables 1 and 2 is expressed by parts by mass as solid matter.

<Preparation of Sample>

Each of the adhesive compositions (Examples 1 to 10 and Comparative Examples 1 to 12) was applied on a canvas (25×70 mm) with a brush at a rate of 300 g (as solid matter)/m$^2$ and on a polypropylene plate (25×70 mm) with a brush at a rate of 150 g (as solid matter)/m$^2$, and the coated samples were dried respectively under an atmosphere at 80° C. for 9 minutes. Then after they were left at room temperature for 1 minute, these two samples were adhered to each other with their coated surface facing each other and the composite obtained was pressed with a hand roller, to give an adhesion product.

<Evaluation>

(1) Initial Adhesive Strength

Ten minutes after the adhesion product was pressed with a roller, the 180° peel strength of the product was determined on a tensile tester at a tensile speed of 200 mm/min.

(2) Normal Adhesive Strength

After the adhesion product was aged under an atmosphere at 23° C. for 5 days, the 180° peel strength of the product was determined on a tensile tester at a tensile speed of 200 mm/min.

(3) Thermal Creep Resistance

After the adhesion product was aged under an atmosphere at 23° C. for 5 days, a load of 100 g/25 mm was applied to the product in the 180° direction under an atmosphere at 80° C. and the peeling length of the product was determined after 24 hours.

<Results>

Results are summarized in the following Tables 1 and 2.

TABLE 1

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | Composition | | | | | | | | | | | | | | |
| Carboxy-modified chloroprene-based copolymer latex A-1 | 50 | 50 | 50 | 80 | 20 | 50 | 50 | 50 | 50 | 50 | 50 | 50 | 50 | 50 | 50 |
| Chloroprene-based polymer latex B-1 | 50 | — | 50 | 20 | 80 | 50 | 50 | 50 | 50 | 50 | 50 | 50 | 50 | 50 | 50 |
| Chloroprene-based polymer latex B-2 | — | 50 | — | — | — | — | — | — | — | — | — | — | — | — | — |

TABLE 1-continued

|  | Example | | | | | | | | | | | | | | |
|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |
| Chlorinated polyolefin resin emulsion C: EW-5303 | 15 | 15 | — | 15 | 15 | 2 | 40 | 15 | 15 | 15 | 60 | 15 | 15 | 15 | 15 |
| Chlorinated polyolefin resin emulsion C: EH-801 | — | — | 15 | — | — | — | — | — | — | — | — | — | — | — | — |
| Zinc oxide | 1 | 1 | 1 | 1 | 1 | 1 | 1 | 1 | 1 | 10 | 1 | 1 | 1 | — | 15 |
| Tackifying resin | 50 | 50 | 50 | 50 | 50 | 50 | 50 | 20 | 80 | 50 | 50 | — | 120 | 50 | 50 |
| Evaluation results | | | | | | | | | | | | | | | |
| Initial adhesive strength (N/mm) | 0.6 | 0.6 | 0.7 | 0.7 | 0.5 | 0.6 | 0.8 | 0.5 | 0.7 | 0.5 | 0.8 | 0.3 | 0.6 | 0.5 | 0.4 |
| Normal adhesive strength (N/mm) | 1.0 | 0.8 | 0.9 | 0.9 | 0.6 | 0.7 | 1.1 | 0.8 | 0.9 | 0.7 | 1.3 | 0.6 | 0.7 | 0.7 | 0.6 |
| Thermal creep resistance (80° C.)(mm) | 0 | 0 | 0 | 0 | 0 | 0 | 0 | 0 | 0 | 0 | 2 | 0 | 2 | 1 | 0 |

TABLE 2

|  | Comparative Example | | | | | | |
|---|---|---|---|---|---|---|---|
|  | 1 | 2 | 3 | 4 | 5 | 6 | 7 |
| Composition | | | | | | | |
| Carboxy-modified chloroprene-based copolymer latex A-1 | 100 | — | — | — | 90 | 10 | 50 |
| Chloroprene-based polymer latex B-1 | — | 100 | — | 50 | 10 | 90 | 50 |
| Chloroprene-based polymer latex B-2 | — | — | 100 | 50 | — | — | — |
| Chlorinated polyolefin resin emulsion C: EW-5303 | 15 | 15 | 15 | 15 | 15 | 15 | — |
| Chlorinated polyolefin resin emulsion C: EH-801 | — | — | — | — | — | — | — |
| Zinc oxide | 1 | 1 | 1 | 1 | 1 | 1 | 1 |
| Tackifying resin | 50 | 50 | 50 | 50 | 50 | 50 | 50 |
| Evaluation results | | | | | | | |
| Initial adhesive strength (N/mm) | 0.7 | 0.2 | 0.1 | 0.6 | 0.6 | 0.2 | 0.4 |
| Normal adhesive strength (N/mm) | 0.7 | 0.2 | 0.3 | 0.7 | 0.8 | 0.3 | 0.5 |
| Thermal creep resistance (80° C.)(mm) | 40 | 5 | 70 | 8 | 15 | 6 | 15 |

As shown in Table 1, the chloroprene rubber latex adhesive compositions of Examples, containing a carboxy-modified chloroprene-based copolymer latex (A), a chloroprene-based polymer latex (B), and a chlorinated polyolefin resin emulsion (C), wherein the content ratio of the carboxy-modified chloroprene-based copolymer latex (A) to the chloroprene-based polymer latex (B) was 80:20 to 20:80 as solid matter, were superior all in initial adhesive strength, normal adhesive strength, and thermal creep resistance.

Meanwhile as shown in Table 2, the chloroprene rubber latex adhesive compositions of Comparative Examples 1 to 4 and 7, which do not contain a carboxy-modified chloroprene-based copolymer latex (A), a chloroprene-based polymer latex (B) or a chlorinated polyolefin resin emulsion (C), and those of Comparative Examples 5 and 6, wherein the content ratio of the carboxy-modified chloroprene-based copolymer latex (A) to the chloroprene-based polymer latex (B) was outside the range of 80:20 to 20:80 as solid matter, did not give results satisfying all of initial adhesive strength, normal adhesive strength, and thermal creep resistance.

When the chloroprene rubber latex adhesive compositions of Examples were compared, those of Examples 1, 6, and 7, which contained a chlorinated polyolefin resin emulsion (C) in an amount in the range of 1 to 50 parts by mass as solid matter, gave evaluation results in thermal creep resistance better than those of the chloroprene rubber latex adhesive composition of Example 11, which contains the chlorinated polyolefin resin emulsion (C) in an amount of more than 50 parts by mass as solid matter. The result indicates that the favorable content of the chlorinated polyolefin resin emulsion (C) is 1 to 50 parts by mass with respect to 100 parts by mass of a total content of the carboxy-modified chloroprene-based copolymer latex (A) and the chloroprene-based polymer latex (B) as solid matter.

Those of Examples 1 and 8 containing the tackifying resin in an amount in the range of 1 to 100 parts by mass as solid matter gave a result that they were superior in adhesive strength to that of Example 12 that contains no tackifying resin. Those of Examples 1 and 9 containing tackifying resin in an amount in the range of 1 to 100 parts by mass as solid matter gave evaluation results in thermal creep resistance better than that of Example 13 containing tackifying resin in an amount of more than 100 parts by mass as solid matter. The result indicates that the favorable content of the tackifying resin is 1 to 100 parts by mass with respect to 100 parts by mass of the total content of the carboxy-modified chloroprene-based copolymer latex (A) and the chloroprene-based polymer latex (B) as solid matter.

Further, the chloroprene rubber latex adhesive composition of Example 1 containing zinc oxide in an amount in the range of 0.5 to 10 parts by mass as solid matter gave an evaluation result that it was superior both in adhesive strength and thermal creep resistance to that of Example 14 containing no zinc oxide. Further, those of Examples 1 and 10 containing zinc oxide in an amount in the range of 0.5 to 10 parts by mass as solid matter were superior in adhesive strength to that of Example 15 containing zinc oxide in an amount of more than 10 parts by mass as solid matter. The result indicates that the favorable content of zinc oxide is 1 to 10 parts by mass with respect to 100 parts by mass of the total content of the carboxy-modified chloroprene-based copolymer latex (A) and the chloroprene-based polymer latex (B) as solid matter.

The invention claimed is:

1. A chloroprene rubber latex adhesive composition comprising
   a carboxy-modified chloroprene-based copolymer latex (A) containing a copolymer of chloroprene monomer and an ethylenic unsaturated carboxylic acid and a polyvinylalcohol,
   a chloroprene-based polymer latex (B) containing a chloroprene homopolymer or a copolymer of chloroprene monomer and other monomers and a rosin acid metal salt and
   a chlorinated polyolefin resin emulsion (C), wherein
   a content ratio of the carboxy-modified chloroprene-based copolymer latex (A) to the chloroprene-based polymer latex (B) is 80:20 to 20:80 as solid matter, and
   a content of the chlorinated polyolefin resin emulsion (C) is 1 to 50 parts by mass as solid matter with respect to 100 parts by mass as solid matter of a total content of the carboxy-modified chloroprene-based copolymer latex (A) and the chloroprene-based polymer latex (B).

2. The chloroprene rubber latex adhesive composition according to claim 1, further comprising a tackifying resin in an amount of 1 to 100 parts by mass as solid matter and zinc oxide in an amount of 0.5 to 10 parts by mass as solid matter with respect to 100 parts by mass as solid matter of a total content of the carboxy-modified chloroprene-based copolymer latex (A) and the chloroprene-based polymer latex (B).

3. The chloroprene rubber latex adhesive composition according to claim 1, for use in adhesion when at least one adherend is a polyolefin.

4. The chloroprene rubber latex adhesive composition according to claim 1, wherein the content of the chlorinated polyolefin resin emulsion (C) is 5 to 50 parts by mass as solid matter with respect to 100 parts by mass as solid matter of the total content of the carboxy-modified chloroprene-based copolymer latex (A) and the chloroprene-based polymer latex (B).

5. The chloroprene rubber latex adhesive composition according to claim 1, wherein the content of the chlorinated polyolefin resin emulsion (C) is 15 to 50 parts by mass as solid matter with respect to 100 parts by mass as solid matter of the total content of the carboxy-modified chloroprene-based copolymer latex (A) and the chloroprene-based polymer latex (B).

6. The chloroprene rubber latex adhesive composition according to claim 1, further comprising a tackifying resin in an amount of 20 to 100 parts by mass as solid matter and zinc oxide in an amount of 0.5 to 10 parts by mass as solid matter with respect to 100 parts by mass as solid matter of a total content of the carboxy-modified chloroprene-based copolymer latex (A) and the chloroprene-based polymer latex (B).

7. A chloroprene rubber latex adhesive composition comprising
   a carboxy-modified chloroprene-based copolymer latex (A) containing a copolymer of chloroprene monomer and an ethylenic unsaturated carboxylic acid and a polyvinylalcohol,
   a chloroprene-based polymer latex (B) containing a chloroprene homopolymer or a copolymer of chloroprene monomer and other monomers and a rosin acid metal salt,
   a chlorinated polyolefin resin emulsion (C),
   a tackifying resin, and
   zinc oxide, wherein
   a content ratio of the carboxy-modified chloroprene-based copolymer latex (A) to the chloroprene-based polymer latex (B) is 80:20 to 20:80 as solid matter,
   a content of the tackifying resin is 20 to 100 parts by mass as solid matter and a content of the zinc oxide is 0.5 to 10 parts by mass as solid matter with respect to 100 parts by mass as solid matter of a total content of the carboxy-modified chloroprene-based copolymer latex (A) and the chloroprene-based polymer latex (B).

* * * * *